(12) United States Patent
Dinjus et al.

(10) Patent No.: US 8,021,112 B2
(45) Date of Patent: Sep. 20, 2011

(54) METHODS AND SYSTEMS FOR MONITORING OPERATION OF A WIND TURBINE

(75) Inventors: Thomas Ernst Dinjus, Greer, SC (US); Bernard Landa, Taylors, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/826,244

(22) Filed: Jun. 29, 2010

(65) Prior Publication Data

US 2011/0142594 A1 Jun. 16, 2011

(51) Int. Cl.
*F03D 7/04* (2006.01)

(52) U.S. Cl. .................. 416/1; 416/26; 416/27; 416/35; 416/43; 416/46; 416/61; 416/153

(58) Field of Classification Search ................ 416/1, 26, 416/27, 31, 35, 43, 46, 61, 147, 153, DIG. 4
See application file for complete search history.

(56) References Cited

U.S. PATENT DOCUMENTS

| | | | | | |
|---|---|---|---|---|---|
| 2,646,131 | A | * | 7/1953 | Mergen et al. | 416/151 |
| 2,738,045 | A | * | 3/1956 | Mergen et al. | 416/151 |
| 3,873,235 | A | * | 3/1975 | Mendelson | 416/154 |
| 3,931,727 | A | | 1/1976 | Luenser | |
| 4,047,842 | A | * | 9/1977 | Avena et al. | 416/152 |
| 4,692,093 | A | * | 9/1987 | Safarik | 416/1 |
| 5,151,681 | A | | 9/1992 | Valmir et al. | |
| 5,452,988 | A | * | 9/1995 | Short et al. | 416/151 |
| 5,907,192 | A | | 5/1999 | Lyons et al. | |
| 6,059,528 | A | * | 5/2000 | Danielson et al. | 416/46 |
| 6,265,785 | B1 | | 7/2001 | Cousineau et al. | |
| 6,477,893 | B1 | | 11/2002 | Djordjevic | |
| 2007/0125607 | A1 | | 6/2007 | Ralea et al. | |
| 2009/0223307 | A1 | | 9/2009 | Staedler et al. | |

* cited by examiner

*Primary Examiner* — Igor Kershteyn
(74) *Attorney, Agent, or Firm* — Armstrong Teasdale LLP

(57) ABSTRACT

A method for monitoring wear of a blade pitch brake within a rotor blade pitch control system of a wind turbine is described. The rotor blade pitch control system includes a blade pitch actuator. The method includes engaging the blade pitch brake and measuring a blade pitch displacement while the blade pitch brake is engaged. The method further includes determining a brake wear level based on the measured blade pitch displacement while the blade pitch brake is engaged, and generating a brake wear level output signal corresponding to the brake wear level.

20 Claims, 6 Drawing Sheets

METHODS AND SYSTEMS FOR MONITORING OPERATION OF A WIND TURBINE

BACKGROUND OF THE INVENTION

The present disclosure relates generally to controlling operation of a wind turbine, and more specifically, to monitoring wear of a brake system included within the wind turbine.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. A power output of a wind turbine generator increases with wind speed until the wind speed reaches a rated wind speed for the turbine. At and above the rated wind speed, the wind turbine generator operates at a rated power. The rated power is an output power at which a wind turbine generator can operate with a predetermined acceptable level of fatigue to turbine components. At wind speeds higher than a certain speed, or at a wind turbulence level that exceeds a predetermined magnitude, typically referred to as a "trip limit" or "monitor set point limit," wind turbines may be shut down, or the loads may be reduced by regulating the pitch of the blades or braking the rotor, in order to protect wind turbine components against damage.

Typically, wind turbine generators include braking devices, for example, a braking device to slow or stop rotation of the rotor and a braking device to hold variable pitch rotor blades in a set position. Each of these braking devices is a wear item and data concerning a state of wear of the braking devices would be beneficial for planning and/or performing maintenance on the wind turbine.

BRIEF DESCRIPTION OF THE INVENTION

In one aspect, a method for monitoring wear of a blade pitch brake within a rotor blade pitch control system of a wind turbine is provided. The rotor blade pitch control system includes a blade pitch actuator. The method includes engaging the blade pitch brake and measuring a blade pitch displacement while the blade pitch brake is engaged. The method further includes determining a brake wear level based on the measured blade pitch displacement while the blade pitch brake is engaged, and generating a brake wear level output signal corresponding to the brake wear level.

In another aspect, a wind turbine rotor blade pitch system is provided. The system includes a rotor blade pitch brake, a pitch actuator, and a displacement sensor configured to measure a displacement of the pitch actuator. The system also includes a processor communicatively coupled to the displacement sensor and configured to determine a brake wear level corresponding to the displacement of the pitch actuator measured while the pitch brake is engaged.

In yet another aspect, a wind turbine is provided. The wind turbine includes a rotor coupled to a wind turbine generator. The rotor includes a plurality of variable pitch rotor blades and a rotor blade pitch control system configured to rotate the plurality of variable pitch rotor blades. The rotor blade pitch control system includes a blade pitch brake, a blade pitch actuator, and a displacement monitoring sensor configured to monitor displacement of the blade pitch actuator. The wind turbine also includes a system controller coupled to the rotor blade pitch control system and configured to control the rotor blade pitch control system. The system controller is configured to receive a signal from the displacement monitoring sensor, monitor the displacement of the blade pitch actuator while the blade pitch brake is engaged, and determine a brake wear level based on the displacement of said blade pitch actuator while said blade pitch brake is engaged.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Technical effects of the methods, systems, and computer-readable media described herein include at least one of: (a) engaging a blade pitch brake; (b) measuring a blade pitch displacement while the blade pitch brake is engaged; (c) determining a brake wear level based on the measured displacement of the blade pitch while the blade pitch brake is engaged; and (d) generating a brake wear level output signal corresponding to the brake wear level.

The methods, systems, and computer readable media described herein facilitate predicting a level of wear present on a component within a blade pitch brake. A displacement of the pitch actuator while the blade pitch brake is engaged is measured and used to predict a level of wear within the blade pitch brake. The displacement of the pitch actuator while the blade pitch brake is engaged corresponds to the level of wear within the blade pitch brake system. The predicted level of wear may be used to generate a wear level warning and/or a maintenance schedule for the wind turbine.

Figure 1:
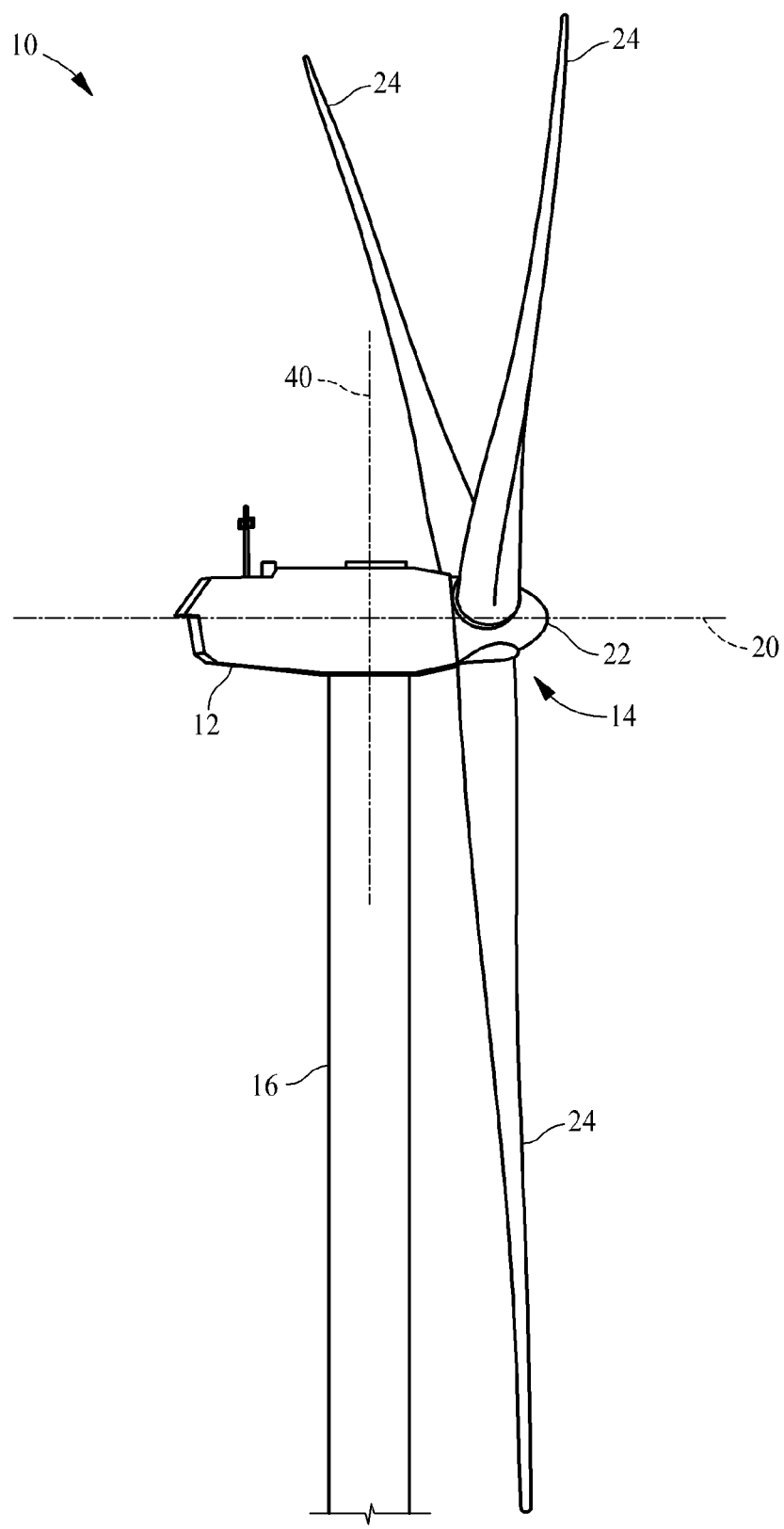
FIG. 1 is a perspective view of a portion of an exemplary wind turbine.
Figure 2:
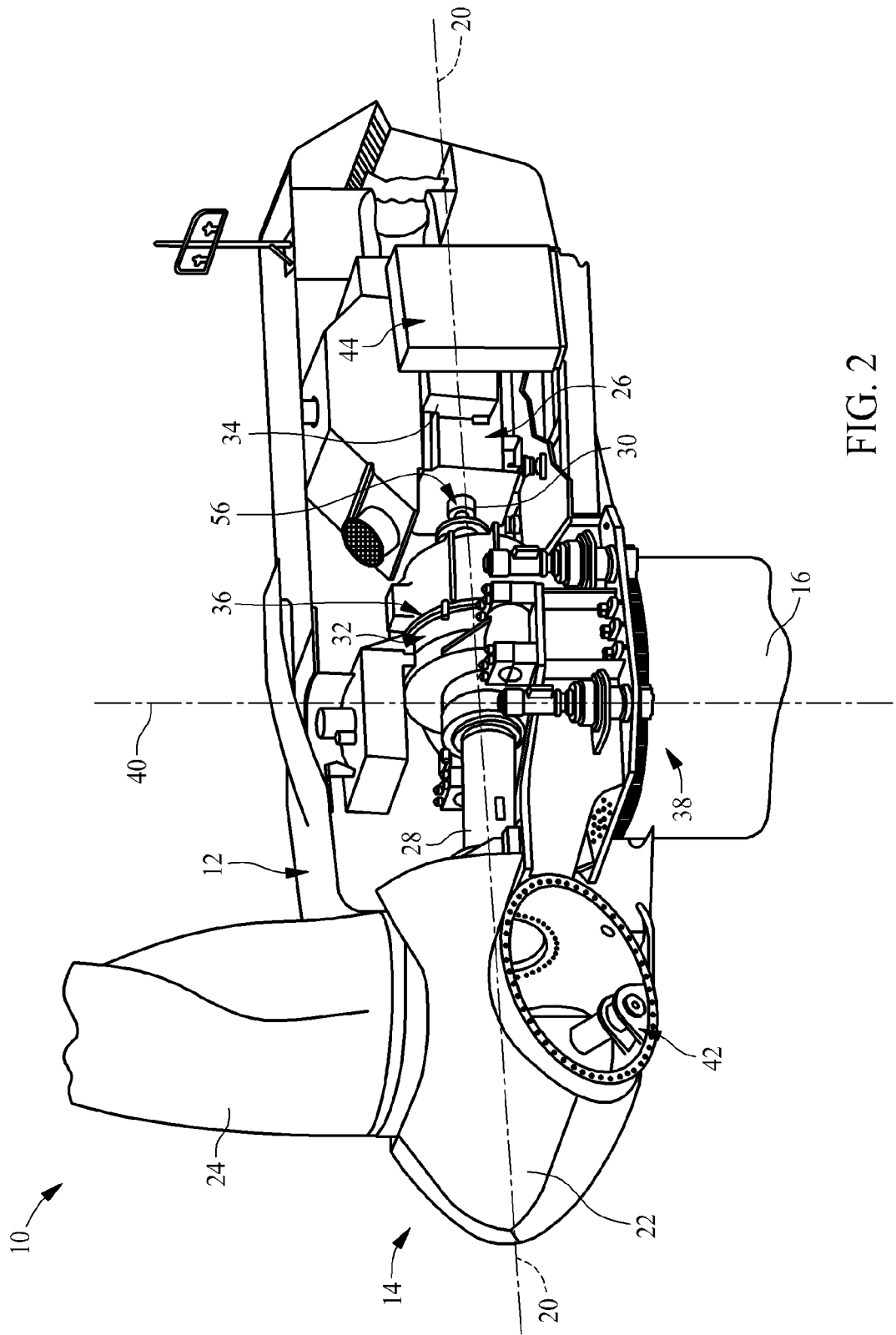
FIG. 2 is a partially cut-away view of a portion of the wind turbine shown in FIG. 1.

FIG. 1 is a perspective view of an exemplary wind turbine 10. FIG. 2 is a partially cut-away perspective view of a portion of wind turbine 10. Wind turbine 10 described and shown herein is a wind turbine generator for generating electrical power from wind energy. Moreover, wind turbine 10 described and illustrated herein includes a horizontal-axis configuration, however, in some embodiments, wind turbine 10 may include, in addition or alternative to the horizontal-axis configuration, a vertical-axis configuration (not shown). Wind turbine 10 may be coupled to an electrical load (not shown in FIG. 1), such as, but not limited to, a power grid, for receiving electrical power therefrom to drive operation of wind turbine 10 and/or its associated components and/or for supplying electrical power generated by wind turbine 10 thereto. Although only one wind turbine 10 is shown in FIGS. 1 and 2, in some embodiments, a plurality of wind turbines 10 may be grouped together, sometimes referred to as a "wind farm."

Wind turbine 10 includes a body or nacelle 12 and a rotor (generally designated by 14) coupled to nacelle 12 for rotation with respect to nacelle 12 about an axis of rotation 20. In the exemplary embodiment, nacelle 12 is mounted on a tower 16, however, in some embodiments, in addition or alternative to tower-mounted nacelle 12, nacelle 12 may be positioned adjacent the ground and/or a surface of water. The height of tower 16 may be any suitable height enabling wind turbine 10 to function as described herein. Rotor 14 includes a hub 22 and a plurality of blades 24 (sometimes referred to as "airfoils") extending radially outwardly from hub 22 for converting wind energy into rotational energy. Although rotor 14 is described and illustrated herein as having three blades 24, rotor 14 may have any number of blades 24. Blades 24 may each have any length that allows wind turbine 10 to function as described herein. For example, in some embodiments, one or more blades 24 are about one-half meter long, while in some embodiments one or more blades 24 are about fifty meters long. Other examples of blade 24 lengths include ten meters or less, about twenty meters, about thirty-seven meters, and about forty meters. Still other examples include blades between about fifty and about one-hundred meters long, and rotor blades greater than one-hundred meters long.

Despite how blades 24 are illustrated in FIG. 1, rotor 14 may have blades 24 of any shape, and may have blades 24 of any type and/or any configuration, whether such shape, type, and/or configuration is described and/or illustrated herein. One example of another type, shape, and/or configuration of blades 24 is a Darrieus wind turbine, sometimes referred to as an "eggbeater" turbine. Yet another example of another type, shape, and/or configuration of blades 24 is a Savonious wind turbine. Moreover, wind turbine 10 may, in some embodiments, be a wind turbine having rotor 14 that generally faces upwind to harness wind energy, and/or may be a wind turbine having rotor 14 that generally faces downwind to harness energy. Of course, in any of the embodiments, rotor 14 may not face exactly upwind and/or downwind, but may face generally at any angle (which may be variable) with respect to a direction of the wind to harness energy therefrom.

Referring now to FIG. 2, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. Generator 26 includes a stator (not shown) and a rotor (not shown) with an air gap included therebetween. Rotor 14 includes a rotor shaft 28 coupled to rotor hub 22 for rotation therewith. Generator 26 is coupled to rotor shaft 28 such that rotation of rotor shaft 28 drives rotation of the generator rotor, and therefore operation of generator 26. In the exemplary embodiment, the generator rotor has a generator shaft 30 coupled thereto and coupled to rotor shaft 28 such that rotation of rotor shaft 28 drives rotation of the generator rotor. In other embodiments, the generator rotor is directly coupled to rotor shaft 28, sometimes referred to as a "direct-drive wind turbine." In the exemplary embodiment, generator shaft 30 is coupled to rotor shaft 28 through a gearbox 32, although in other embodiments generator shaft 30 is coupled directly to rotor shaft 28.

The torque of rotor 14 drives the generator rotor to thereby generate variable frequency AC electrical power from rotation of rotor 14. Generator 26 has an air gap torque between the generator rotor and stator that opposes the torque of rotor 14. A power conversion assembly 34 is coupled to generator 26 for converting the variable frequency AC to a fixed frequency AC for delivery to an electrical load (not shown in FIG. 2), such as, but not limited to a power grid (not shown in FIG. 2), coupled to generator 26. Power conversion assembly 34 may include a single frequency converter or a plurality of frequency converters configured to convert electricity generated by generator 26 to electricity suitable for delivery over the power grid. Power conversion assembly 34 may also be referred to herein as a power converter. Power conversion assembly 34 may be located anywhere within or remote to wind turbine 10. For example, power conversion assembly 34 may be located within a base (not shown) of tower 16.

In some embodiments, wind turbine 10 may include a rotor speed limiter, for example, but not limited to a disk brake 36. Disk brake 36 brakes rotation of rotor 14 to, for example, slow rotation of rotor 14, brake rotor 14 against full wind torque, and/or reduce the generation of electrical power from electrical generator 26. Furthermore, in some embodiments, wind turbine 10 may include a yaw system 38 for rotating nacelle 12 about an axis of rotation 40 for changing a yaw of rotor 14, and more specifically for changing a direction faced by rotor 14 to, for example, adjust an angle between the direction faced by rotor 14 and a direction of wind.

In the exemplary embodiment, wind turbine 10 includes a blade pitch system 42 for controlling, including but not limited to changing, a pitch angle of blades 24 with respect to a wind direction. Blade pitch system 42 is coupled to hub 22 and blades 24 for changing the pitch angle of blades 24 by rotating blades 24 with respect to hub 22.

Figure 3:
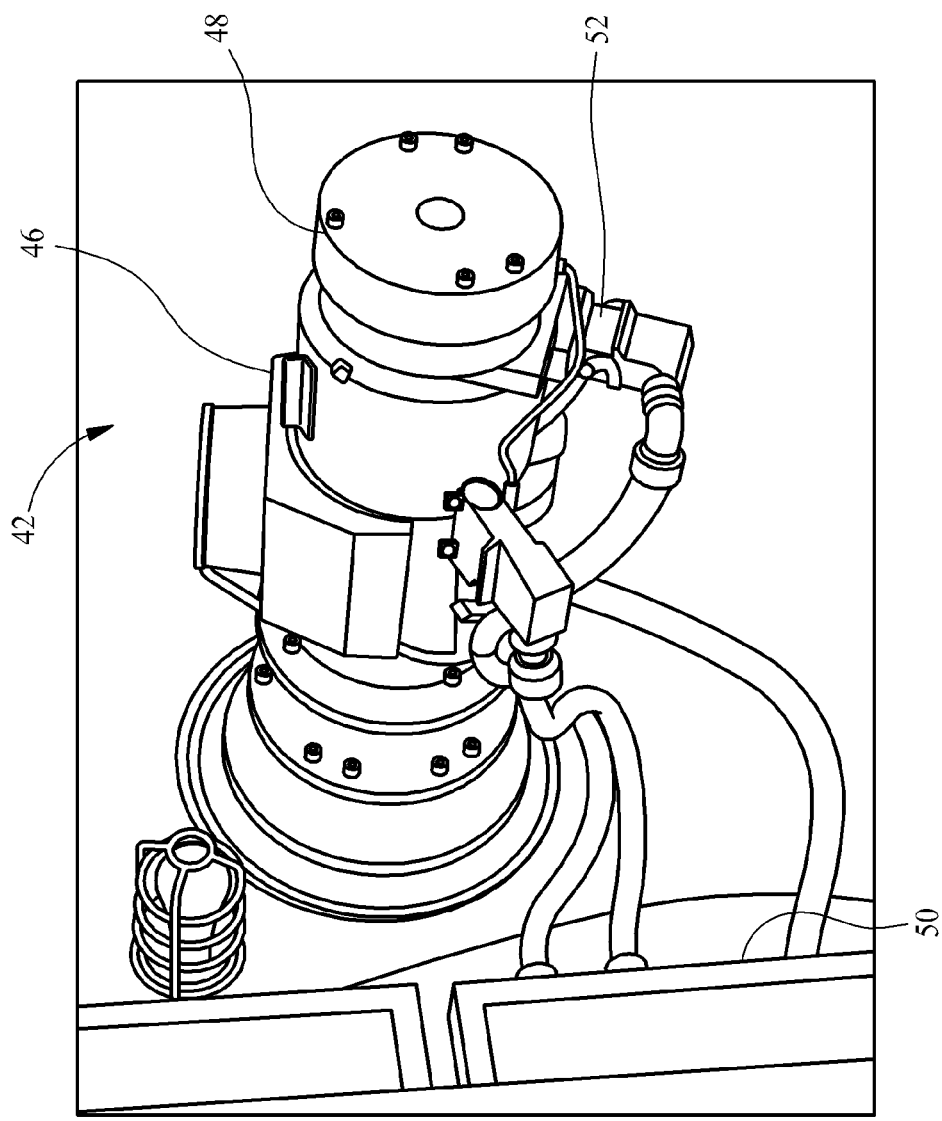
FIG. 3 is a perspective view of an exemplary blade pitch system for use in the wind turbine shown in FIG. 1.

FIG. 3 is a perspective view of an exemplary embodiment of blade pitch system 42 (shown in FIG. 2). In the exemplary embodiment, blade pitch system 42 includes at least one pitch actuator 46, a blade pitch brake 48, a blade pitch controller 50, and a blade pitch displacement sensor 52. Although described herein as separate from system controller 44 (shown in FIG. 2), in at least some embodiments, blade pitch controller 50 may be included within system controller 44. In the exemplary embodiment, each blade 24 is coupled to one pitch actuator 46 and pitch actuator 46 rotates blades 24 with respect to hub 22 (shown in FIG. 2). For example, blade 24 may be directly coupled to pitch actuator 46, or coupled to pitch actuator 46 through a series of gears (not shown in FIG. 3). In the exemplary embodiment, pitch actuator 46 is an electric motor, however, pitch actuator 46 may include any suitable structure, configuration, arrangement, means, and/or components, whether described and/or shown herein, such as, but not limited to, hydraulic cylinders, springs, and/or servo-mechanisms. Moreover, pitch actuator 46 may be driven by any suitable means, whether described and/or shown herein, such as, but not limited to, hydraulic fluid, electrical power, electro-chemical power, and/or mechanical power, such as, but not limited to, spring force. In the exemplary embodiment, one blade pitch brake 48 is coupled to each pitch actuator 46. Blade pitch brake 48 may be coupled anywhere within rotor blade pitch system 42 that facilitates preventing movement of blade 24 relative to hub 22.

In the exemplary embodiment, when engaged, blade pitch brake 48 prevents pitch actuator 46 from moving, and therefore, prevents the pitch of blade 24 from changing. For example, blade pitch brake 48 may include a brake pad and/or clamp (not shown in FIG. 3) that prevents motion of pitch actuator 46 when pressed against a moving component within pitch actuator 46. Blade pitch brake 48 is released when system controller 44 sends a blade pitch adjustment signal to pitch actuator 46. Blade pitch brake 48 is engaged when the desired blade pitch is achieved. In the exemplary embodiment, blade pitch brake 48 is a coil-engaged electromechanical brake. In the exemplary embodiment, when the electromagnetic coil is energized, a brake pad of blade pitch brake 48 is disengaged, for example, held in a non-braking position away from pitch actuator 46. When the electromagnetic coil is not energized, a biasing device (e.g., a spring) presses the brake pad against a portion of pitch actuator 46, which maintains the blade pitch. As the blade pitch brake 48 wears, the ability of blade pitch brake 48 to prevent movement of pitch actuator 46 is reduced.

In the exemplary embodiment, wind turbine 10 includes blade pitch displacement sensor 52. Blade pitch displacement sensor 52 measures a blade pitch displacement, for example, by directly measuring the blade pitch displacement and/or by measuring a displacement of blade pitch actuator 46. For example, displacement sensor 52 may include, but is not limited to, an encoder, a potential meter, a linear variable displacement transducer (LVDT), and/or any other device suitable for measuring a change in blade pitch and/or a displacement of pitch actuator 46. A displacement of pitch actuator 46 is defined herein not as a distance moved by pitch actuator 46 to reach a second position from a first position, but rather as a total amount of pitch actuator 46 motion. For example, when pitch actuator 46 is a rotational actuator, if pitch actuator 46 rotates one and a half revolutions in a first direction and one and a half revolutions in the opposite direction, the displacement of pitch actuator 46 is three revolutions. Furthermore, when pitch actuator 46 is a linear actuator, if pitch actuator 46 translates one half inch in a first direction and one half inch in the opposite direction, the displacement of pitch actuator 46 is one inch.

Displacement sensor 52 provides output data to, for example, system controller 44 and/or blade pitch controller 50. When blade pitch brake 48 is engaged, and blade pitch brake 48 is not in need of maintenance, a displacement of pitch actuator 46 is low. However, as blade pitch brake 48 wears, the displacement of blade pitch actuator 46 increases even when blade pitch brake 48 is engaged. In other words, as blade pitch brake 48 wears, it is increasingly unable to prevent movement of pitch actuator 46, and therefore, a displacement of pitch actuator 46 measured by displacement sensor 52 increases. Similarly, when displacement sensor 52 is configured to measure a change in blade pitch, the change in blade pitch while blade pitch brake 48 is engaged increases as blade pitch brake 48 wears.

Figure 4:
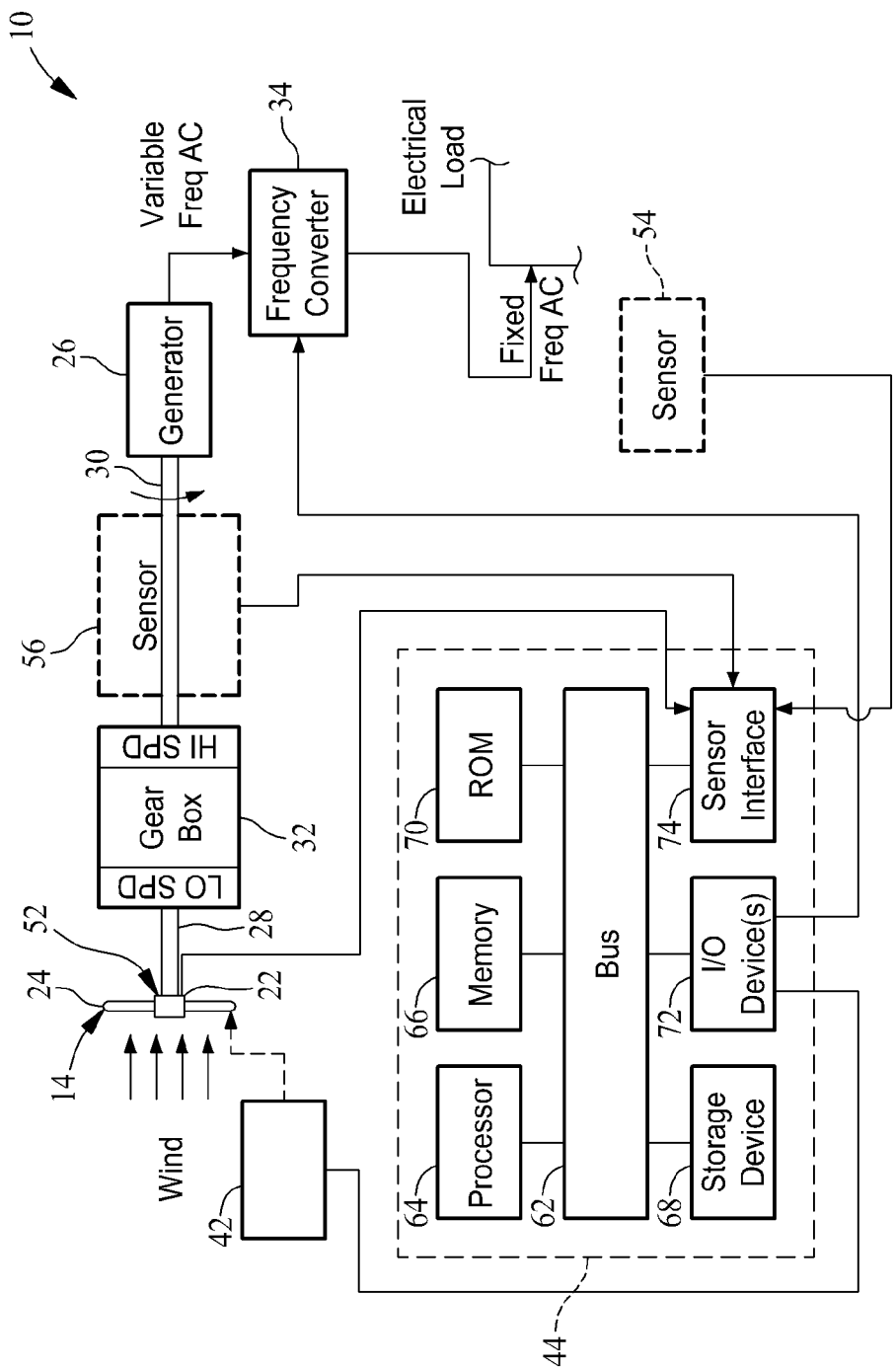
FIG. 4 is a block diagram of the wind turbine shown in FIG. 1.

FIG. 4 is a block diagram of an exemplary embodiment of wind turbine 10. In the exemplary embodiment, wind turbine 10 includes one or more system controllers 44 coupled to at least one component of wind turbine 10 for generally controlling operation of wind turbine 10 and/or controlling operation of the components thereof, regardless of whether such components are described and/or shown herein. For example, system controller 44 is coupled to pitch system 42 for generally controlling the pitch of blades 24. In the exemplary embodiment, system controller 44 is mounted within nacelle 12 (shown in FIG. 2), however, additionally or alternatively, one or more system controllers 44 may be remote from nacelle 12 and/or other components of wind turbine 10. System controllers 44 may be used for overall system monitoring and control including, without limitation, pitch and speed regulation, high-speed shaft and yaw brake application, yaw and pump motor application, and/or fault monitoring. Alternative distributed or centralized control architectures may be used in some embodiments.

In an exemplary embodiment, wind turbine 10 includes a plurality of sensors, for example, sensors 54 and/or 56. Sensors 54 and/or 56 measure a variety of parameters including, without limitation, operating conditions and atmospheric conditions. Each sensor 54 and/or 56 may be an individual sensor or may include a plurality of sensors. Sensors 54 and/or 56 may be any suitable sensor having any suitable location within or remote to wind turbine 10 that allows wind turbine 10 to function as described herein. In some embodiments, sensors 54 and 56 are coupled to system controller 44 for transmitting measurements to system controller 44 for processing thereof.

In some embodiments, system controller 44 includes a bus 62 or other communications device to communicate information. One or more processor(s) 64 are coupled to bus 62 to process information, including information from sensors 52, 54, and 56 and/or other sensor(s). Processor(s) 64 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

System controller 44 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64. Processor(s) 64 process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

System controller 44 may also include, or may be coupled to, input/output device(s) 72. Input/output device(s) 72 may include any device known in the art to provide input data to system controller 44 and/or to provide outputs, such as, but not limited to, yaw control and/or pitch control outputs. Instructions may be provided to RAM 66 from storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 72 may include, without limitation, computer peripherals associated with an operator interface such as a mouse and a keyboard (neither shown in FIG. 4). Alternatively, other computer peripherals may also be used that may include, for example, a scanner (not shown in FIG. 4). Furthermore, in the exemplary embodiment, additional output channels may include, for example, an operator interface monitor (not shown in FIG. 4). System controller 44 may also include a sensor interface 74 that allows system controller 44 to communicate with sensors 52, 54, and 56 and/or other sensor(s). Sensor interface 74 may include one or more analog-to-digital converters that convert analog signals into digital signals that can be used by processor(s) 64.

Figure 5:
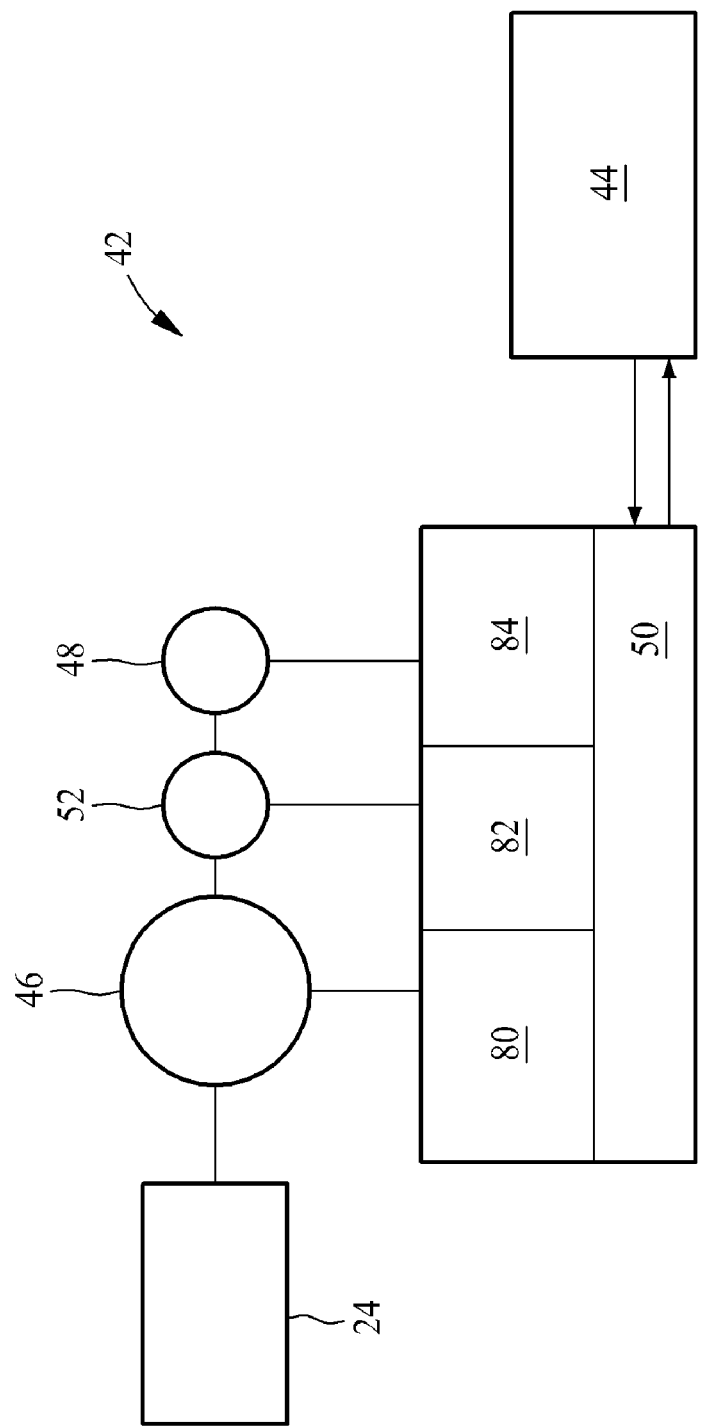
FIG. 5 is a block diagram of the blade pitch system shown in FIG. 3.

FIG. 5 is a block diagram of rotor blade pitch system 42 (shown in FIG. 3). In the exemplary embodiment, blade pitch controller 50 includes a blade pitch actuator control module 80, an encoder/decoder module 82 and a brake control module 84. The term controller, as used herein, refers to a processor, for example, central processing units, microprocessors, microcontrollers, reduced instruction set circuits (RISC), application specific integrated circuits (ASIC), logic circuits, and any other circuit or processor capable of executing the functions described herein. In the exemplary embodiment, system controller 44 provides blade pitch controller 50 with blade pitch control signals. For example, when a change from a ten degree blade pitch to a five degree blade pitch is requested, brake control module 84 energizes blade pitch brake 48, which disengages blade pitch brake 48. After a predefined brake actuation delay (e.g., a predetermined length of time to allow pitch brake 48 to disengage from pitch actuator 46), blade pitch controller 50 provides pitch actuator 46 with a signal instructing pitch actuator 46 to change the pitch of blade 24 from ten degrees to five degrees. Once the five degree pitch is achieved, brake control module 84 de-energizes blade pitch brake 48, which engages blade pitch brake 48. While blade pitch brake 48 is engaged, encoder/decoder module 82 receives displacement signals from displacement sensor 52 and provides the displacement signals to, for example, system controller 44 for processing. System controller 44 uses the displacement signals to determine a brake wear level.

Figure 6:
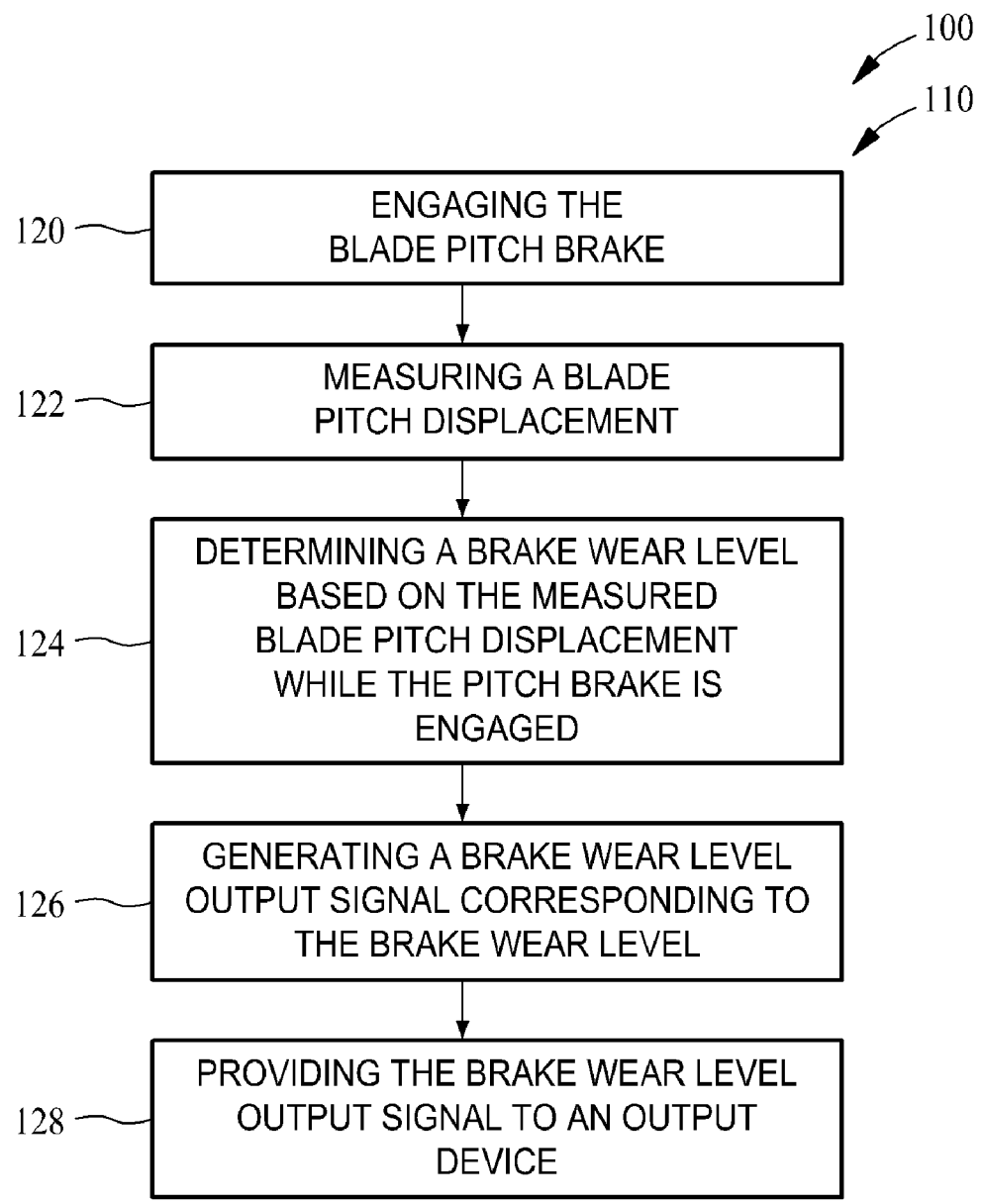
FIG. 6 is a flow chart showing an exemplary method for monitoring wear of a blade pitch brake within the blade pitch system of FIG. 3.

FIG. 6 is a flow chart 100 showing an exemplary method 110 of monitoring wear of a blade pitch brake, for example, blade pitch brake 48 (shown in FIG. 3). In an exemplary embodiment, method 110 is a computer-implemented method, for example, a computer-implemented method executed by a workstation and/or personal computer, for example, system controller 44 (shown in FIG. 4). In another exemplary embodiment, a computer program embodied on a computer readable medium includes at least one code segment, that when executed by a computer, performs method 110. In the exemplary embodiment, method 110 includes engaging 120 blade pitch brake 48. Method 110 also includes measuring 122 a blade pitch displacement while pitch brake 48 is engaged. In the exemplary embodiment, blade pitch displacement is measured 122 by measuring a displacement of a blade pitch actuator, for example, blade pitch actuator 46 (shown in FIG. 3). For example, system controller 44 counts encoder pulses received from a displacement sensor, for example, displacement sensor 52 (shown in FIG. 3), when pitch brake 48 is engaged.

In the exemplary embodiment, method 110 also includes determining 124 a brake wear level based on the measured blade pitch displacement while pitch brake 48 is engaged. As described above, displacement of blade pitch actuator 46, when pitch brake 48 is engaged to prevent displacement of blade pitch actuator 46, is an indication that wear of components within pitch brake 48 (e.g., a brake pad) has reached a noticeable level. In the exemplary embodiment, method 110 also includes generating 126 a brake wear level output signal corresponding to the brake wear level. Method 110 may also include providing 128 the brake wear level output signal to an output device, for example, but not limited to, a monitor, a signal board, a cellular phone, an alarm, and/or any other output device that converts the brake wear signal to a visual alert, an auditory alert, and/or a tactile alert (e.g., vibration) that can be sensed by an operator of the wind turbine. The brake wear level output signal may be provided 128 to an output device when brake wear surpasses a predetermined brake wear level, for example, a brake wear level stored in ROM 70 (shown in FIG. 4). Alternatively, the brake wear level output signal may include multiple brake wear signals, each representing a different level of brake wear. For example, a first brake wear signal may correspond to minor wear, informing a wind turbine operator that it is recommended that maintenance be scheduled in, for example, six months. A second brake wear signal may correspond to more extensive wear, informing a wind turbine operator that it is recommended that maintenance be scheduled in, for example, one month. A third brake wear signal may correspond to even more extensive wear, informing a wind turbine operator that it is recommended that maintenance be performed immediately. Although described as three levels of brake wear signals, any number of brake wear signals may be used that allow for monitoring brake wear as described herein.

In the exemplary embodiment, determining 124 a brake wear level includes determining a brake loss value. In the exemplary embodiment, a brake loss over time value is determined For example, a number of encoder pulses received from displacement sensor 52 while pitch brake 48 is engaged is tracked each day, resulting in a brake loss per day value. An increasing brake loss per day value indicates that brake wear is increasing. Predefined levels of brake loss per day values may be stored, for example, in ROM 70, and used to generate 126 the brake wear level output signal.

In an alternative embodiment, the brake loss value consists of a total number of encoder pulses received from displacement sensor 52 while pitch brake 48 is engaged. Predefined levels of total encoder pulses may be stored and used to generate 126 the brake wear level output signal. The brake loss value may be determined after a delay included in the calculation to prevent a transition time between a disengaged position and an engaged position from being included in the brake loss determination. For example, encoder pulses received during a pitch brake actuation delay may be disregarded and/or a predefined number of encoder pulses may be disregarded before tracking the encoder pulses used to determine the brake loss value.

The above-described embodiments facilitate efficient and cost-effective operation of a wind turbine. The blade pitch control system described herein provides an operator of the wind turbine with a prediction of the level of wear present in the blade pitch brakes. This prediction facilitates more accurate scheduling of maintenance tasks including, but not limited to, changing brake pads within the blade pitch brakes. The prediction facilitates preventing brake wear from interrupting wind turbine operation, for example, due to issues caused by preventative maintenance tasks not being performed, including, but not limited to, damage to the blade pitch system caused by overdue or non-performed maintenance. The prediction also facilitates preventing performance of unnecessary maintenance tasks. Without additional brake wear data, a wind turbine operator may schedule maintenance tasks (e.g., brake pad replacement) at a low end of an expected brake pad life. For example, it may be estimated that a brake pad lasts between six and nine months, depending upon use of the brake pad. Therefore, a wind turbine operator may schedule replacement of the brake pad at six months in order to ensure the brake pad is replaced before causing damage to the blade pitch system. If use of the brake pad is low during those six months, the brake pad could have been used longer without risking damage to the blade pitch system. Furthermore, the wind turbine was unnecessarily shut down to perform the maintenance, reducing the output of the wind turbine. The methods and systems described herein provide an operator of the wind turbine with information that is indicative of an amount of wear present in a rotor blade pitch brake, from which maintenance schedules may be based.

Exemplary embodiments of a wind turbine are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring wear of a blade pitch brake within a rotor blade pitch control system of a wind turbine, the rotor blade pitch control system including a blade pitch actuator, the method comprising:
    engaging the blade pitch brake;
    measuring a blade pitch displacement while the blade pitch brake is engaged;
    determining a brake wear level based on the measured blade pitch displacement while the blade pitch brake is engaged; and,
    generating a brake wear level output signal corresponding to the brake wear level.

2. A method in accordance with claim 1, wherein measuring a blade pitch displacement comprises measuring a displacement of the blade pitch actuator.

3. A method in accordance with claim 2, wherein measuring a displacement of the blade pitch actuator comprises counting a number of encoder pulses received from an encoder coupled to the blade pitch actuator.

4. A method in accordance with claim 3, further comprising activating an encoder pulse count delay to prevent counting encoder pulses occurring while the pitch brake is transitioning between a disengaged position and an engaged position, wherein the encoder pulse count delay is a predefined number of encoder pulses after which counting the number of encoder pulses used to determine a brake wear level begins.

5. A method in accordance with claim 3, wherein determining a brake wear level comprises determining a brake loss over time value, the brake loss over time value corresponding to a sum of an absolute value of encoder pulses counted while the pitch brake is engaged over a predetermined time period, an increasing brake loss over time value indicates an increasing brake wear level.

6. A method in accordance with claim 3, wherein determining a brake wear level comprises:
    tracking, while the pitch brake is engaged, a total number of encoder pulses; and,
    comparing the total number of encoder pulses to at least one stored encoder pulse count that defines the brake wear level.

7. A method in accordance with claim 1, wherein measuring a blade pitch displacement comprises measuring blade pitch displacement after a predetermined pitch brake actuation delay, wherein the pitch brake actuation delay is a predetermined time period between when the pitch brake is disengaged and engaged.

8. A method in accordance with claim 1, wherein determining a brake wear level comprises determining one of a maintenance required level, a schedule future maintenance level, and a maintenance not recommended level.

9. A method in accordance with claim 1, wherein generating a brake wear level output signal comprises outputting a recommended maintenance schedule corresponding to the brake wear level.

10. A wind turbine rotor blade pitch system, comprising:
    a wind turbine rotor blade pitch brake;
    a wind turbine rotor blade pitch actuator;
    a displacement sensor configured to measure a displacement of the rotor blade pitch actuator; and,
    a processor communicatively coupled to the displacement sensor and configured to receive a signal from the displacement sensor, the processor monitors the displacement of the rotor blade pitch actuator while the rotor blade pitch brake is engaged and determines a brake wear level based on the displacement of the rotor blade pitch actuator measured while the rotor blade pitch brake is engaged.

11. A system in accordance with claim 10, wherein the displacement sensor comprises an encoder coupled to the rotor blade pitch actuator, the processor configured to count a number of encoder pulses in the displacement signal.

12. A system in accordance with claim 11, wherein the processor is further configured to activate an encoder pulse count delay to prevent counting encoder pulses occurring while the rotor blade pitch brake is engaging.

13. A system in accordance with claim 10, wherein the displacement sensor is configured to measure the rotor blade pitch actuator displacement after conclusion of a pitch brake actuation delay.

14. A system in accordance with claim 10, wherein the processor is further configured to output a brake wear level signal to an operator of the wind turbine, the brake wear level signal corresponding to the brake wear level and comprising at least one of a maintenance required level, a schedule future maintenance level, and a maintenance not recommended level.

15. A wind turbine, comprising:
    a rotor coupled to a wind turbine generator, said rotor comprising a plurality of variable pitch rotor blades and a rotor blade pitch control system configured to rotate said plurality of variable pitch rotor blades, said rotor blade pitch control system comprising a blade pitch brake, a blade pitch actuator, and a displacement monitoring sensor configured to monitor displacement of said blade pitch actuator;
    a system controller coupled to said rotor blade pitch control system and configured to control said rotor blade pitch control system, said system controller configured to receive a signal from said displacement monitoring sensor, monitor the displacement of said blade pitch actuator while said blade pitch brake is engaged, and determine a brake wear level based on the displacement of said blade pitch actuator while said blade pitch brake is engaged.

16. A wind turbine in accordance with claim 15, wherein said system controller is further configured to generate a brake wear level output signal corresponding to the brake wear level.

17. A wind turbine in accordance with claim 16, further comprising an output device configured to receive the brake wear level output signal and generate an output indicating the brake wear level to a wind turbine operator.

18. A wind turbine in accordance with claim 15, wherein the brake wear level comprises at least one of a maintenance required level, a schedule future maintenance level, and a maintenance not recommended level.

19. A wind turbine in accordance with claim 15, wherein said system controller is further configured to track the displacement, while said blade pitch brake is engaged, of said blade pitch actuator over a predetermined time period.

20. A wind turbine in accordance with claim 15, wherein said system controller is further configured to track a total displacement, while said pitch brake is engaged, of said blade pitch actuator.

* * * * *